(12) United States Patent
Selegean (10) Patent No.: US 11,349,957 B2
(45) Date of Patent: May 31, 2022

(54) AUTOMATIC KNOWLEDGE MANAGEMENT FOR DATA LINEAGE TRACKING

(71) Applicant: Bank of America Corporation, Charlotte, NC (US)

(72) Inventor: Jane Selegean, New York, NY (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 15/931,895

(22) Filed: May 14, 2020

(65) Prior Publication Data
US 2021/0360085 A1 Nov. 18, 2021

(51) Int. Cl.
| | |
|---|---|
| H04L 67/00 | (2022.01) |
| G06F 8/656 | (2018.01) |
| H04L 41/5074 | (2022.01) |
| G06F 11/30 | (2006.01) |
| H04L 41/08 | (2022.01) |
| H04L 41/0813 | (2022.01) |
| H04L 41/147 | (2022.01) |

(52) U.S. Cl.
CPC .............. *H04L 67/34* (2013.01); *G06F 8/656* (2018.02); *G06F 11/30* (2013.01); *G06F 11/3051* (2013.01); *H04L 41/08* (2013.01); *H04L 41/0813* (2013.01); *H04L 41/147* (2013.01); *H04L 41/5074* (2013.01)

(58) Field of Classification Search
CPC ..... H04L 67/34; H04L 41/0813; H04L 41/08; G06F 11/3051
See application file for complete search history.

(56) References Cited

U.S. PATENT DOCUMENTS

| | | | |
|---|---|---|---|
| 4,819,160 A * | 4/1989 | Tanka | G06F 16/2365 |
| 6,282,175 B1 * | 8/2001 | Steele | G06F 11/3051 |
| | | | 370/254 |
| 8,819,010 B2 | 8/2014 | Fankhauser et al. | |
| 9,348,879 B2 | 5/2016 | Mohammad et al. | |
| 9,451,051 B1 * | 9/2016 | Ray | H04L 67/38 |
| 10,025,878 B1 | 7/2018 | Lefever et al. | |
| 10,210,240 B2 | 2/2019 | Vasisht et al. | |
| 10,303,690 B1 | 5/2019 | Todd et al. | |
| 10,331,660 B1 | 6/2019 | Chapin | |
| 10,394,532 B2 | 8/2019 | Bar-Or et al. | |
| 10,489,384 B2 | 11/2019 | Gould et al. | |
| 10,503,905 B1 | 12/2019 | Misra et al. | |

(Continued)

Primary Examiner — Ramy M Osman (57) ABSTRACT

A memory record of a knowledge management tool stores data lineage criteria. A processor of the knowledge management tool receives a request to change one or more of a configuration of a server, a code of a hosted application, and a configuration of the hosted application. The processor determines whether a misalignment is detected associated with the requested change being outside at least one of the predefined ranges of values for server configuration data and application configuration data of the data lineage criteria. If the misalignment is not detected, the requested change is allowed to be implemented in one or both of the server and the hosted application. If the misalignment is detected, an alert is provided to an administrator device. If a response to the alert indicates to implement the requested change, implementation of the requested change is allowed. Otherwise, implementation of the requested change is prevented.

15 Claims, 4 Drawing Sheets

(56) References Cited

U.S. PATENT DOCUMENTS

| | | | |
|---|---|---|---|
| 10,540,173 B2* | 1/2020 | Patton | G06F 16/256 |
| 10,540,334 B1 | 1/2020 | Eswaran et al. | |
| 2005/0216902 A1* | 9/2005 | Schaefer | G06F 8/61 |
| | | | 717/168 |
| 2008/0101258 A1* | 5/2008 | Cheng | H04L 12/66 |
| | | | 370/254 |
| 2009/0170472 A1* | 7/2009 | Chapin | H04W 12/086 |
| | | | 455/410 |
| 2011/0238377 A1* | 9/2011 | Scarpelli | G06F 11/3409 |
| | | | 702/186 |
| 2013/0238641 A1* | 9/2013 | Mandelstein | G06F 16/211 |
| | | | 707/756 |
| 2014/0207920 A1* | 7/2014 | Hirana | H04L 41/0803 |
| | | | 709/220 |
| 2014/0208290 A1* | 7/2014 | McGillin | G06F 16/214 |
| | | | 717/106 |
| 2014/0237564 A1* | 8/2014 | Dudziak | H04L 63/08 |
| | | | 726/6 |
| 2015/0012477 A1 | 1/2015 | Mohammad et al. | |
| 2015/0012478 A1 | 1/2015 | Mohammad et al. | |
| 2015/0154077 A1* | 6/2015 | Marra | H04L 67/34 |
| | | | 714/15 |
| 2015/0347193 A1 | 12/2015 | Wolfson et al. | |
| 2016/0028580 A1 | 1/2016 | Radivojevic et al. | |
| 2016/0042285 A1* | 2/2016 | Gilenson | G06F 11/3051 |
| | | | 706/47 |
| 2016/0094392 A1* | 3/2016 | Gabrielson | H04L 41/147 |
| | | | 709/221 |
| 2016/0196187 A1 | 7/2016 | Thakur et al. | |
| 2016/0232229 A1 | 8/2016 | Radivojevic | |
| 2016/0232230 A1 | 8/2016 | Radivojevic | |
| 2016/0291991 A1* | 10/2016 | Costecalde | G06F 9/44505 |
| 2017/0033971 A1 | 2/2017 | Radivojevic et al. | |
| 2017/0270022 A1 | 9/2017 | Moresmau et al. | |
| 2017/0351728 A1 | 12/2017 | Halberstadt et al. | |
| 2017/0351991 A1 | 12/2017 | Halberstadt et al. | |
| 2018/0004781 A1 | 1/2018 | Mukherjee et al. | |
| 2018/0089277 A1 | 3/2018 | Vankamamidi et al. | |
| 2018/0089291 A1 | 3/2018 | Vankamamidi et al. | |
| 2018/0173774 A1 | 6/2018 | McPherson et al. | |
| 2018/0181630 A1 | 6/2018 | He et al. | |
| 2018/0240273 A1 | 8/2018 | Gordon et al. | |
| 2018/0248701 A1 | 8/2018 | Johnson et al. | |
| 2019/0065523 A1 | 2/2019 | Singh et al. | |
| 2019/0155826 A1 | 3/2019 | Vasisht et al. | |
| 2019/0188308 A1 | 6/2019 | Simon et al. | |
| 2019/0197149 A1 | 6/2019 | Chapin | |
| 2019/0220458 A1 | 7/2019 | Chapin | |
| 2019/0324879 A1* | 10/2019 | Abraham | G06F 11/3079 |
| 2019/0392638 A1 | 12/2019 | Gordon et al. | |
| 2020/0012666 A1 | 1/2020 | Walters et al. | |
| 2020/0099569 A1 | 3/2020 | Radivojevic et al. | |
| 2021/0081216 A1* | 3/2021 | Komarov | G06F 21/78 |

\* cited by examiner

AUTOMATIC KNOWLEDGE MANAGEMENT FOR DATA LINEAGE TRACKING

TECHNICAL FIELD

The present disclosure relates generally to server and application management. More particularly, in certain embodiments, the present disclosure is related to automatic knowledge management for data lineage tracking.

BACKGROUND

An application is computer software that allows a user to perform certain tasks such as those associated with word processing, searching for information, analyzing and presenting information, playing a game, and the like. In some cases, an application may be implemented on a single computing device such as a personal computer, smart phone or the like. In some cases, an application may be hosted on one or more network-accessible devices, such that a user may access the application and perform associated tasks without having the application executed on the user's computing device. A server may be used to implement such hosted applications, such that processing and memory resources used by the application may be distributed across different hardware resources of the server. There exists a need for improved tools for managing applications and server infrastructure.

SUMMARY

In an embodiment, a system includes a server configured to host an application and a knowledge management tool. A memory of the knowledge management tool stores data lineage criteria. The data lineage criteria includes predefined ranges of values for server configuration data and application configuration data. A processor of the knowledge management tool is coupled to the memory. The processor receives a request to change one or more of a configuration of the server, a code of the hosted application, and a configuration of the hosted application. The processor determines whether a misalignment is detected associated with the requested change being outside at least one of the predefined ranges of values for server configuration data and application configuration data of the data lineage criteria. In response to determining that the misalignment is not detected, the requested change is allowed to be implemented in one or both of the server and the hosted application. In response to determining that the misalignment is detected, an alert is provided to an administrator device. The alert includes an indication of the detected misalignment and a request for a confirmation to implement the requested change. In response to receiving a response to the alert indicating to implement the requested change, implementation of the requested change is allowed. In response to receiving a response to the alert indicating not to implement the requested change, implementation of the requested change is prevented.

Previous technology lacks tools for identifying potential issues associated with a change to an application or the configuration of a server (e.g., of a server used to host the application or provide memory or processing resources for use by the application). For example, a developer may wish to change the code of a deployed application, but the desired change may not be within appropriate tolerances for providing continued reliable function of the application. For instance, a desired change may not be appropriately compatible with a current database schema, the configuration of existing reference tables, the typical data synchronization times of the application, and the like. In some cases, the developer making a desired change to application code may have failed to incorporate the appropriate data capture mechanisms into the code to provide meaningful data analytics insights downstream. Changes to the configuration of a server may result in loss of network connectivity, inadequate processing resources, inadequate memory resources, and the like. Previous technology fails to provide tools for reliably and efficiently monitoring changes to applications and server infrastructure. Instead, previous technology relies on ad hoc developer communication to detect any potential issues when changes to an application or server are implemented.

Certain embodiments of this disclosure provide unique solutions to technical problems of previous systems for managing server infrastructure and applications (e.g., hosted applications). For example, the disclosed knowledge management system provides several technical advantages, which include: 1) the detection of misalignments between requested changes to an application and/or server and predefined data lineage criteria, which are based on past configurations of the application and/or server; 2) the effective maintenance and updating of these data lineage criteria to more accurately detect misalignments as application code and/or server configurations evolve over time; and 3) the prevention of the implementation of changes to an application and/or server configuration until anticipated issues associated with misalignments are cleared by an administrator. As such, this disclosure may improve the function of computer systems used to manage servers and host applications. For example, the system described in this disclosure may decrease processing resources used for not only monitoring deployed applications and server configurations but also managing changes to these. In some embodiments, lineage information, associated with the history of application and server configurations, may be updated over time in order to facilitate improved data analytics, such that application and server data may be efficiently presented to administrators. As such, the system may also or alternatively reduce or eliminate practical and technical barriers to providing actionable insights to administrators based on this data. The systems described in this disclosure may particularly be integrated into a practical application for not only alerting administrators to possible misalignments between requested changes to application(s) and/or server configurations and data lineage criteria but also updating the data lineage criteria based on responses provided by the administrators.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior technology lacks tools for reliably detecting issues associated with changes to an application and/or server configuration. The knowledge management system described in this disclosure solves the technical problems of previous technology by tracking the lineage (e.g., evolution or change over time) of application code, server configuration and associated data storage. This lineage information is used to adjust data lineage criteria which facilitate the determination of whether a newly requested change to an application and/or server may be problematic (e.g., may result in decreased performance, decreased data security, loss of certain desired functionality, and/or the like). The knowledge management system may facilitate the "gating" of requested changes to an application and/or server configuration, such that changes are not implemented unless the changes are approved by a knowledge management tool and/or an appropriate administrator. The system also facilitates the effective analysis of up-to-date lineage data and presentation of this information for review by an administrator.

Data Lineage Management System

Figure 1:
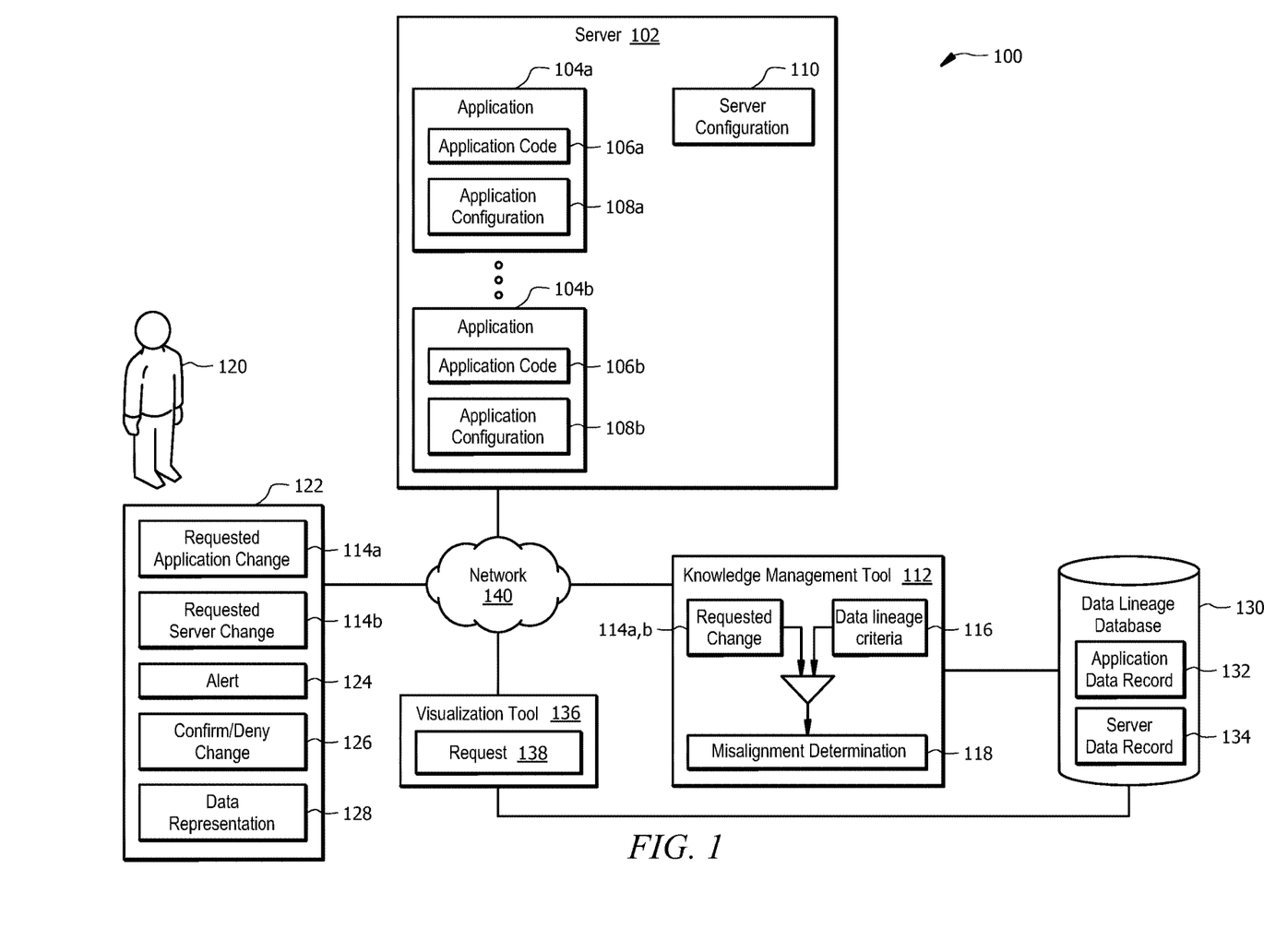
FIG. 1 is a schematic diagram of an example system for a knowledge management.

FIG. 1 is a schematic diagram of an example system 100 for knowledge management. The system 100 includes one or more servers 102, a knowledge management tool 112, an administrator device 122, a data lineage database 130, a data lineage visualization tool 136, and a network 140. As described in greater detail below with respect to FIGS. 2 and 3, the knowledge management tool 112 determines if a requested change 114a,b to the server 102 and/or an application 104a,b satisfies predetermined data lineage criteria 116 for the server 102 and applications 104a,b. The data lineage criteria 116 may be predefined by an administrator 120 and updated over time based on data 132, 134 collected in the data lineage database 130. If the criteria 116 are not satisfied, the knowledge management tool 112 may prevent the change 114a,b from being implemented. In other words, the knowledge management tool 112 may act as a gate to prevent the implementation of changes 114a,b, which may result in issues associated with the performance and/or functionality of the application 104a,b and/or server 102. In some cases, if the criteria 116 are not satisfied, an alert 124 may be presented to an administrator 120, such that the administrator may provide a confirmation or denial 126 of the change 114a,b. If the administrator 120 confirms that the requested change 114a,b should be implemented, the knowledge management tool 112 may implement the change and update the records 132, 134 in the data lineage database 130. The data lineage criteria 116 may also be updated based on the updated records 132, 134. As such, the knowledge management tool 112 facilitates both (i) the prevention of errors or unexpected outcomes when requested changes 114a,b are outside an expected range associated with the criteria 116 and (ii) the effective maintenance of a data lineage database 130, which may be used for the user-friendly visualization of changes in application data 132 and server configuration data 134 over time (e.g., via visualization tool 136 described below).

The one or more servers 102 may include any computing device, or collection of computing devices, configured to host applications 104a,b or provide memory and/or processing resources for use by the applications 104a,b. The server(s) 102 may include servers of any type. For example, the server(s) 102 may include one or more baremetal server components, one or more hybrid server components, and/or one or more cloud server components. The server configuration 110 generally includes parameters associated with how the server 102 is configured to operate. For example, the server configuration 110 may include the type and number of devices included in the server 102, a data storage type used by the server 102, a log configuration of the server 102, a network configuration of the server 102, an amount of memory available to the server 102, processing resources available to the server 102, and the like. The server(s) 102 may be implemented using the processor, memory, and interfaces of device 400 described with respect to FIG. 4 below.

The applications 104a,b are generally software for performing a computing task or providing a computing service. For instance, an application 104a,b may be used for a particular task associated with one or more of word processing, data analysis, data presentation, text searching, data presentation, gaming, or the like. The application code 106a,b of a given application 104a,b generally includes instructions presented in any appropriate programming language for implementing the functions of the application 104a,b. The application code 106a,b may be any type of code. Each application configuration 108a,b generally corresponds to the parameters associated with how the corresponding application 104a,b is configured to operate. For example, an application configuration 108a,b may include the type and number of devices on which the corresponding application 104a,b is implemented, a data storage type used by the application 104a,b, the amount of processing resources allocated to the application 104a,b, how frequently data accessed by the application 104a,b is synchronized with the application 108a,b, and the like.

The knowledge management tool 112 may be any computing device or collection of computing devices operable (e.g., installed) at both the level of the server 102 and the applications 104a,bs. The knowledge management tool 112 may monitor computing resources associated with the server(s) 102, an operating system implemented by the server(s) 102, configurations 108a,b of the applications 104a,b, application code 106a,b, databases, network characteristics, and/or other parameters of the server configuration 110. The knowledge management tool 112 may be implemented using the processor, memory, and interfaces of device 400 described with respect to FIG. 4 below.

The knowledge management tool 112 is configured to receive an indication of a requested change 114a,b and make a misalignment determination 118 for the change 114a,b. For example, the knowledge management tool 112 may determine whether a requested change 114a to an application 104a,b and/or a requested change 114b to the server 102 (e.g., to the server configuration 110) is within a predefined set of data lineage criteria 116. For example, the knowledge management tool 112 may compare the requested change(s) 114a,b to the data lineage criteria 116, as described in greater detail below with respect to FIGS. 2 and 3 below. The data lineage criteria 116 may include predefined ranges of values for server configuration 110 and the application configuration data (i.e., the application code 106a,b and application configuration 108a,b). For example, the data lineage criteria 116 may include approved ranges of values or lists of approved values associated with predefined data schema, database access roles, data contexts and descriptions, data synchronization times, other characteristics of the server 102 and/or application 104a,b (e.g., how an application 104a,b is distributed among resources of the server 102), the schema and refresh characteristics of data sources associated with the server 102 and/or applications 104a,b, and the like.

The knowledge management tool 112 is also configured to manage and update information stored in the data lineage database 130. For example, if code changes are detected the application data record 130 stored in the data lineage database 130 may be updated. The data lineage records 132, 134 may be adjusted to account for approved changes to the application code 106a,b, application configuration 108a,b, and/or the server configuration 110. In some embodiments, the knowledge management tool 112 may detect that a requested change 114a,b (i.e., to an application 104a,b and/or to the server 102) may result in a new data sources being needed for functionality. For example, a change 114a to the application code 106a,b may call data from a data source that is currently unavailable to the application 104a,b. Once detected, the knowledge management tool 112 may automatically provide an alert 124 to the administrator 120 such that the server 102 and/or application 104a,b may be appropriately reconfigured to allow access to the data source. As another example, a change 114a to the application code 106a,b may result in the loss of a data capture protocol such that, for example, appropriate logging of application usage will not be provided if the change 114a were implemented.

The administrator device 122 is generally any computing device operable to receive input of a requested change 114a,b from a user 120 and provide the requested change 114a,b to the knowledge management tool 112 (e.g., via network 140). A user 120 of the device 122 may be an administrator of the server 102 and/or applications 104a,b. The user 120 may be a developer of the code 106a,b for the applications 104a,b. The device 122 also includes a display for presenting an alert 124 provided by the knowledge management tool 112. As described in greater detail below with respect to FIGS. 2 and 3, the alert 124 may include an indication that the misalignment determination 118 is associated with the requested change 114a,b. The device 122 may also facilitate the presentation of a data representation 128 provided by the visualization tool 136. For example, the user 120 may provide a request 138 to the visualization tool 136 to view a portion of the information stored in the data lineage database 130, as described in greater detail below. The user device 122 may be implemented using the processor, memory, and interface of device 400 described with respect to FIG. 4 below.

The data lineage database 130 is generally a data store, or database, operable to receive, store, and/or transmit lineage data such as application data record 132 and server data record 134. The database 130 may be any type of database (e.g., a relational or a non-relational database). The knowledge management tool 112 may be configured to determine data lineage data associated with any type of application code 106a,b, application configuration 108a,b and server configuration 110 and store this information in the database 130 as application data record 132 and server data record 134. The application data record 132 may include a record (e.g., of information over time) of the application code 106a,b (e.g., the instructions included in the code 106a,b) and the application configuration 108a,b (e.g., the type and number of devices on which the corresponding application 104a,b is implemented, a data storage type used by the application 104a,b, the amount of processing resources allocated to the application 104a,b, and the like) of applications 104a,b. The server data record 134 may include a record (e.g., of information over time) of the server configuration 110 (e.g., the type and number of devices included in the server 102, a data storage type used by the server 102, a log configuration of the server 102, a network configuration of the server 102, and the like). The data lineage database 130 may be implemented using the processor, memory, and interfaces of device 400 described with respect to FIG. 4 below.

In some embodiments, a visualization tool 136 may be coupled to the data lineage database 130, such that the "architecture" of the application(s) 104a,b and/or server(s) 102 may be provided as a visual data representation 128 at the administrator device 122. For example, the data representation 128 may be a map of the architecture of the application(s) 104a,b and/or server(s) 102 (i.e., a map of how the applications(s) 104a,b are implemented in the infrastructure of the server(s) 102 and/or a map illustrating connections between the application(s) 104a,b and other data sources, business units, users, and the like). As an example, presentation of such a data representation 128 may facilitate the efficient and reliable identification of data of interest and its location (e.g., in memory of the server 102 or an associated database). As another example, presentation of such a data representation 128 may facilitate the identification of routes to improving the efficiency and/or performance of the application(s) 104a,b for users. Operation of the visualization tool 136 is described in greater detail below with respect to FIGS. 2 and 3. The visualization tool 136 may be implemented using the processor, memory, and interfaces of device 400 described with respect to FIG. 4 below.

Network 140 facilitates communication between and amongst the various components of the system 100. This disclosure contemplates network 140 being any suitable network operable to facilitate communication between the components of the system 100. Network 140 may include any interconnecting system capable of transmitting audio, video, signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Figure 2:
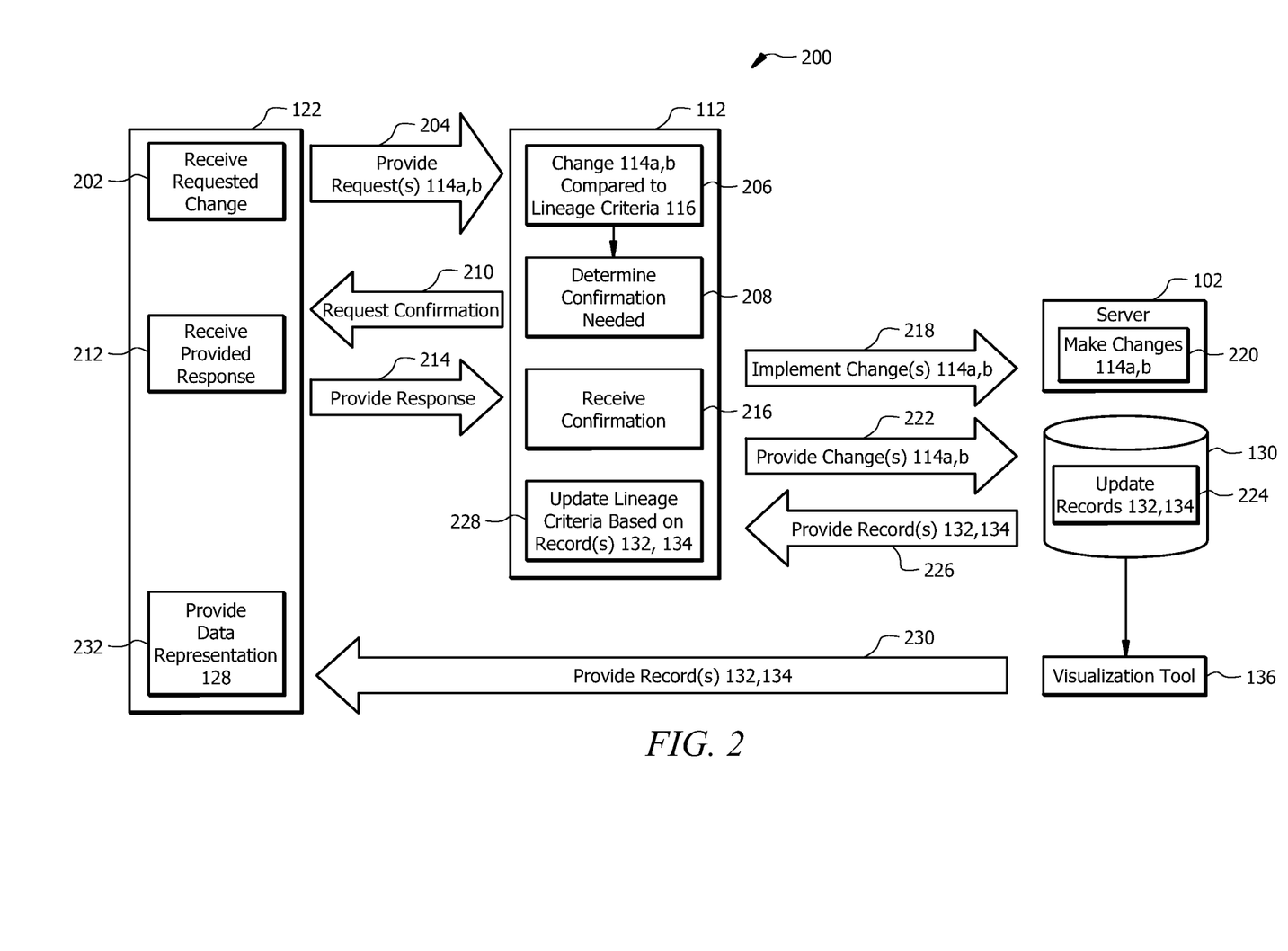
FIG. 2 is a flow diagram illustrating an example operation of the system illustrated in FIG. 1.

An example operation of the system 100 is illustrated in the flow diagram 200 of FIG. 2. As illustrated in FIG. 2, at step 202, a requested change 114a,b is received by the administrator device 122. For example, the administrator 120 may provide a request 114a to change the code 106a,b and/or the configuration 108a,b of a corresponding application 104a,b. The administrator 120 may also or alternatively provide a request 114b to change the server configuration 110. At step 204, the request(s) 114a,b are provided to the knowledge management tool 112. For example, the request(s) 114a,b may be provided via network 140 of FIG. 1. At step 206, the knowledge management tool 112 compares the requested change(s) 114a,b to the data lineage criteria 116 in order to determine if a misalignment is detected.

For example, if the request(s) 114a,b include a request 114a to change application code 104a,b such that data is synchronized at a rate that is not within a threshold range included in the criteria 116, a misalignment may be detected. As another example, if the request(s) 114a,b include a request 114a to change application code 104a,b such that monitoring protocols indicated in the criteria 116 are no longer present, a misalignment may be detected. As yet another example, if the request(s) 114a,b include a request to access a data source that is not currently accessible to the application(s) 104a,b and/or server(s) 102, a misalignment may be detected. In the example of FIG. 2, the knowledge management tool 112 determines, at step 208, that confirmation of the requested change(s) 114a,b is needed because a misalignment is detected between the requested change(s) 114a,b. Other examples of detecting such a misalignment are described below with respect to FIG. 3.

At step 210, the knowledge management tool sends a request for confirmation to implement the requested change(s) 114a,b. At step 212, the administrator device 122 receives a response to the request from step 210. For example, the administrator device may receive the request from step 210, display an alert 124 indicating that confirmation is requested, and receive an input of a response which includes an indication to confirm or deny implementation of the requested change(s) 114 (i.e., via confirmation or denial 126 of FIG. 1). The alert 124 may include an indication of which data lineage criteria 116 are not satisfied by the requested change(s) 114a,b. For example, if a request 114a to change application code 104a,b includes an instruction to synchronize application data at a rate that is not within a threshold range included in the criteria 116, the alert 124 may indicate that the synchronization time is not within the criteria 116 for the application 104a,b. The alert 124 may include information about each misalignment detected for the request 114a,b. For instance, the alert 124 may indicate that a monitoring protocol will be absent if the change(s) 114a,b is/are implemented and/or that a data source is missing which is needed for proper operation following implementation of the requested change(s) 114a,b. At step 214, this response from the administrator 120 is provided to the knowledge management tool 112.

In the example of FIG. 2, the response indicates that the administrator 120 has confirmed that the requested change(s) 114a,b should be implemented. At step 216, the knowledge management tool 112 receives the confirmation 126. In response to receiving the confirmation 126 at step 216, the knowledge management tool 112 allows the requested change(s) 114a,b to be implemented at the server 102 and/or application(s) 104a,b at step 218. For example, the application code 106a,b may be amended according to a request 114a to change the code 106a,b of an application 104a,b. For example, the server configuration 110 may be changed according to a request 114b to change the configuration 110 of the server 102. In other words, the knowledge management tool 112 acts as a gate to delay implementation of requested change(s) 114a,b that are outside the data lineage criteria 116 until an administrator 120 confirms he/she still desires to implement the change(s) 114a,b.

After receiving the confirmation 126 at step 216, the knowledge management tool 112 provides the now implemented change(s) 114a,b to the data lineage database 130 at step 222 and uses this information to update the records 132, 134 at step 224. For example, for an implemented change 114a to the code 106a,b and/or configuration 108a,b to a corresponding application 104a,b, the application data record 132 is updated to include this change 114a along with a timestamp associated with the time that the change 114a was implemented. As another example, for an implemented change 114b to the configuration 110 of the server 102, the server data record 134 is updated to include this change 114b along with a timestamp associated with the time that the change 114b was implemented.

As described above, the data lineage criteria 116 may be updated based on changes over time to the records 132, 134. In this way, the criteria 116 can be adjusted (e.g., to be more or less restrictive) based on the history of administrator-approved changes 114a,b to the application(s) 104a,b and/or server(s) 102. At step 226, the application data record 132 and server data record 134 (e.g., or a portion of this information) are provided to the knowledge management tool 112 for use in updating the data lineage criteria 116 at step 228. As an example, if a change 114a to the application(s) 104a,b did not satisfy the criteria 116 but was approved (e.g., confirmed for implementation) by the administrator 120, the criteria 116 may be adjusted such that a future request 114a for the administrator-approved request to similarly adjust the application(s) 104a,b will be allowed. For instance, if the data synchronization time of a requested change 114a was outside a threshold range of synchronization times but the administrator allowed this synchronization time, the criteria 116 may be updated to include the requested synchronization time in the threshold range. As another example, if a change 114b to the server(s) 102 did not satisfy the criteria 116 but was approved (e.g., confirmed for implementation) by the administrator 120, the criteria 116 may be adjusted such that a future request 114b for the administrator-approved request to adjust the server(s) 102 will be allowed.

As also described above, in some embodiments, the visualization tool 136 facilitates the efficient and effective presentation of information associated with the records 132, 134 maintained by the knowledge management tool 112 in the data lineage database 130. This information may be presented as the data representation 128 described above with respect to FIG. 1. At step 230, the visualization tool 136 may provide a portion of the records 132, 134 (e.g., or results of analysis performed using the records 132, 134) to the administrator device 122. At step 230, the administrator device 122 presents the data representation 128 based on the provided information. For example, the data representation 128 may be a map illustrating in which hardware components of the server 102 various functions or tasks of the applications(s) 104a,b are implemented. As another example, the data representation 128 may include a map illustrating connections between the application(s) 104a,b and users of the application(s) 104a,b.

Example Operation of the Knowledge Management System

Figure 3:
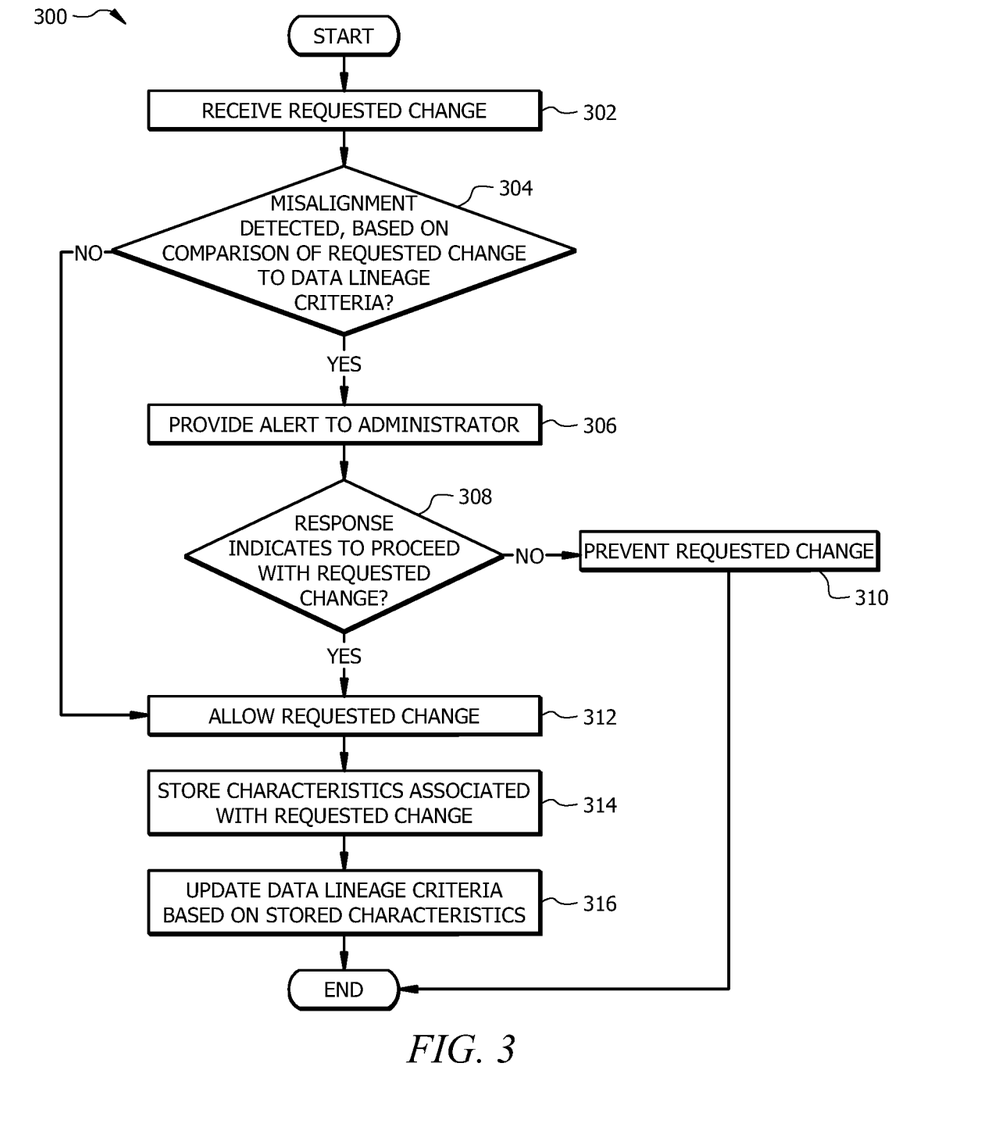
FIG. 3 is a flowchart illustrating an example method of knowledge management.

FIG. 3 is a flowchart of an example method 300 for operating the knowledge management system 100 of FIG. 1. The method 300 generally facilitates not only the management of data lineage information for server(s) 102 and application(s) 104a,b but also the detection of requested changes 114a,b to these server(s) 102 and application(s) 104a,b which do not satisfy predefined criteria 116 associated with providing reliable system performance. The method 300 may begin at step 302 where a requested change 114a,b to the server(s) 102 and/or application(s) 104a,b is received by the knowledge management tool 112. As described above, a requested change 114a to an application 114a,b may include an amendment to the application code 106a,b and/or to the application configuration 108a,b. For example, a requested change 114a to the code 106a,b may include a change to one or more instructions included in the code 106a,b (e.g., instructions associated with a frequency at which data is synchronized in the application 104a,b, monitoring protocols included in the code 106a,b, data sources to which access is requested in the code 106a,b, and the like), and a requested change 114a to the application configuration 108a,b may include a change to one or more of the type and number of devices on which the corresponding application 104a,b is implemented, a data storage type used by the application 104a,b, and the amount of processing resources allocated to the application 104a,b. A requested change 114b to the server(s) 102 may include a change to the server configuration 110. For example, a requested change 114b to the server configuration 110 may include a change to one or more of the type and/or number of devices included in the server 102, a data storage type used by the server 102, a log configuration of the server 102, a network configuration of the server 102, and the like.

At step 304, the knowledge management tool 112 compares the requested change 114a,b to the predefined data lineage criteria 116 to determine whether a misalignment is detected (i.e., to achieve the misalignment determination 118 of FIG. 1). For example, one or more requested changes 114a to the application code 104a,b and configuration 108a,b may be compared to a predefined ranges of values in the criteria 116 associated with the application code 106a,b and the application configuration 108a,b. If the requested changes 114a,b are within the predefined range of values included in the criteria 116, then a misalignment is generally not detected. For example, a requested instruction to implement in the code 106a,b may be compared to a predefined set of approved instructions included in the criteria 116 (e.g., instructions previously allowed by the administrator 120 of the applications 104a,b). For instance, if a requested change 114a includes an instruction to synchronize application data at a given rate, this rate may be compared to a threshold rate range (i.e., a range of previously allowed synchronization rates) that is included in the criteria 116. If the synchronization rate of the requested change 114a is not within the threshold range of the data lineage criteria 116, a misalignment is detected at step 304.

As another example, a requested configuration 108a,b (e.g., the type and number of devices on which the application 104a,b is implemented, a data storage type used by the application 104a,b, the amount of processing resources allocated to the application 104a,b and the like) associated with the change 114a may be compared to a predefined range of configuration parameters (e.g., a threshold range of values for number of devices on which the application 104a,b is implemented, the amount of memory allocated to the application 104a,b, the amount of processing resources allocated to the application 104a,b, etc.) included in the criteria 116. For instance, if the request 114a includes a request to decrease the processing resources below a threshold value included in the criteria 116, a misalignment may be detected.

Similarly, one or more requested changes 114b to the server configuration 110 may be compared to a predefined range of values in the criteria 116 for the server configuration 110. As an example, a requested change 114b to the type of devices included in the server 102 may be compared to a predefined list of allowed device types included in the criteria 116 (e.g., device types previously allowed to be included in the server 102). If the request 114b indicates to include a device not on the list, a misalignment may be detected at step 304. As another example, a requested change 114b to the number of devices included in the server 102 may be compared to a threshold range of values included in the criteria 116 (e.g., a range of numbers of devices previously allowed to be included in the server 102). If the request 114b indicates to include a number of devices that is not with this threshold range, a misalignment may be detected at step 304. As another example, a requested change 114b to the log configuration of the server 102 may be compared to a predefined set of log configurations included in the criteria 116 (e.g., a set of log configurations previously allowed to be used by the server 102). If the request 114b indicates to include a log configuration that is not included in the criteria 116, a misalignment may be detected at step 304. As yet another example, a requested change 114b to the network configuration of the server 102 may be compared to a predefined set of network configurations included in the criteria 116 (e.g., a set of network configurations previously allowed to be used by the server 102). If the request 114b indicates to include a network configuration that is not included in the criteria 116, a misalignment may be detected at step 304.

Still referring to step 304, in some cases, the knowledge management tool 112 may detect that a change 114a,b requires additional resources to achieve appropriate functionality. For example, a requested change 114a may be a request to amend code 106a,b of the application 104a,b such that the application 104a,b with the amended code 106a,b will access data from a data source that is not available to the application 104a,b. The knowledge management tool 112 may determine that the data source is not available to the application 104a,b with the amended code 106a,b. In some cases, the knowledge management tool 112 may automatically provide access to the data source. However, in some cases, this automatic provision of the data source may not be possible. In such cases, the detection of the unavailable data source may be treated as a misalignment (e.g., and included in the alert 124 described below in step 306 such that an administrator may provide access to the data source or amend the code 106a,b to no longer request access to the data source). If a misalignment is not detected at step 304, the knowledge management tool 112 proceeds to step 312, described below. Otherwise, if a misalignment is detected at step 304, the knowledge management tool 112 proceeds to step 306.

At step 306, the knowledge management tool 112 provides an alert 124 to the administrator 120. The alert 124 includes an indication of the detected misalignment from step 304 and a request for a confirmation or denial 126 to implement the requested change 114a,b. At step 308, the knowledge management tool 112 receives a response which includes the confirmation or denial 126 to implement the requested change 114a,b and determines, based on this response, whether to allow the requested change 114a,b to be implemented. If the response denies implementation of the requested change 114a,b, the knowledge management tool 112 prevents implementation of the requested change at step 310. Otherwise, if the response confirms that the requested change 114a,b should be implemented, the knowledge management tool 112 proceeds to step 312.

At step 312, the requested change is allowed to be implemented. For example, a requested change 114a to the application 104a,b may be implemented by allowing a change to the application code 106a,b and/or application configuration 108a,b. Similarly, a requested change 114b to the server 102 may be implemented by allowing a change to the server configuration 110.

At step 314, the knowledge management tool 112 provides the now implemented change(s) 114a,b to the data lineage database 130 and uses this information to update the records 132, 134 stored in the database 130. As described above with respect to FIGS. 1 and 2, in some embodiments, a visualization tool 136 may be coupled to the data lineage database 130. The visualization tool 136 may receive a request 138 to provide a visual representation 128 of a portion of one or both of the application data record 132 and the server data record 134. The visualization tool 136 may then generate the requested visual representation 128 and provide the visual representation 128 for viewing via the administrator device 122. The representation 128 may include an application and/or server architecture map, as described, and/or any charts, graphs, or the like for representing the data lineage information stored in the data lineage database 130.

At step 316, the data lineage criteria 116 are updated based on the administrator-confirmed change 114a,b and/or other information stored in the data lineage database 130. As an example, if a change 114a to the application 104a,b did not satisfy the criteria 116 but was approved (e.g., confirmed for implementation) by the administrator 120, the criteria 116 may be adjusted such that a future request 114a for the administrator-approved request to adjust the application 104a,b will be allowed. For instance, if the data synchronization time of a requested change 114a was outside a threshold range of synchronization times but the administrator allowed this synchronization time, the criteria 116 may be updated to include the requested synchronization time in the threshold range. As another example, if a change 114b to the server(s) 102 did not satisfy the criteria 116 but was approved (e.g., confirmed for implementation) by the administrator 120, the criteria 116 may be adjusted such that a future request 114b for the administrator-approved request to adjust the server(s) 102 will be allowed.

Example Device for Knowledge Management

Figure 4:
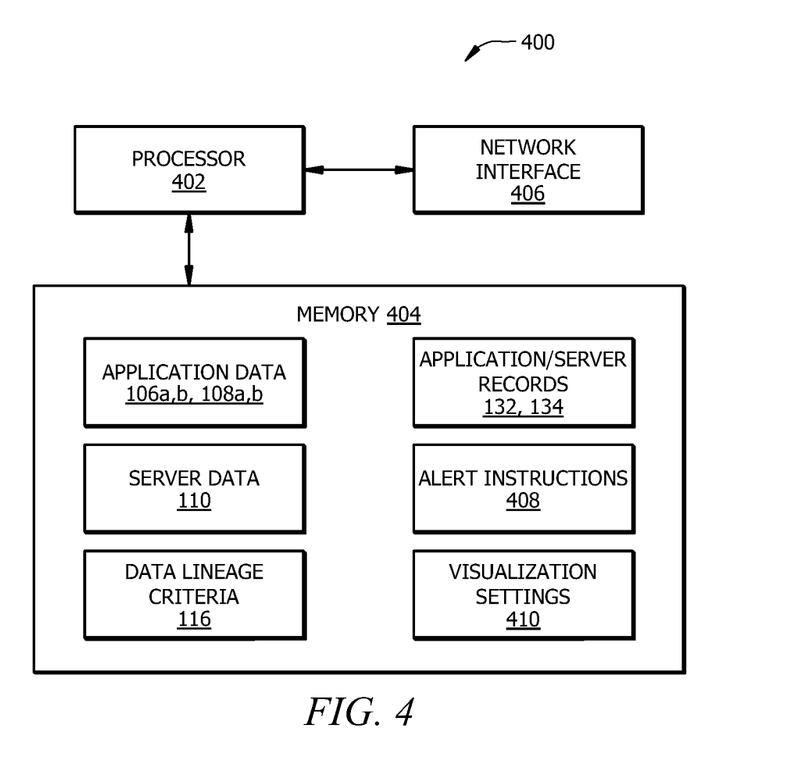
FIG. 4 is a diagram of an example device configured to implement the system of FIG. 1.

FIG. 4 is an embodiment of a device 400 configured to implement the system 100. The device 400 includes a processor 402, a memory 404, and a network interface 406. The device 400 may be configured as shown or in any other suitable configuration. The device 400 may be and/or may be used to implement the server(s) 102, knowledge management tool 112, administrator device 122, data lineage database 130, and visualization tool 136 of FIG. 1.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 200 of FIG. 2 and method 300 of FIG. 3. In an embodiment, the function described herein is implemented using logic units, FPGAs, ASICs, DSPs, or any other suitable hardware or electronic circuitry.

The memory 404 is operable to store application data 106a,b, 108a,b, server configuration data 110, application and server records 132, 134, alert instructions 408, visualization settings 410, and any other data, instructions, logic, rules, or code operable to execute the function described herein. The alert instructions 410 generally include instructions or rules for generating and presenting the alert 124 described above with respect to FIG. 1. The visualization settings 410 include instructions and/or parameters for presented in the data representation 128 of FIG. 1. The visualization settings 410 may be configured by the administrator 120. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a server configured to host an application;
a data lineage database comprising an application data record comprising a record of application configuration data and a server data record comprising a record of server configuration data;
a knowledge management tool, comprising:
a memory configured to store data lineage criteria, the data lineage criteria comprising predefined ranges of values for the server configuration data and the application configuration data; and
a processor coupled to the memory and configured to:
receive a request to change one or more of a configuration of the server, a code of the hosted application, and a configuration of the hosted application;
determine whether a misalignment is detected associated with the requested change being outside at least one of the predefined ranges of values for the server configuration data and the application configuration data of the data lineage criteria;
in response to determining that the misalignment is not detected, allow the requested change to be implemented in one or both of the server and the hosted application;
in response to determining that the misalignment is detected:
provide an alert to an administrator device, the alert comprising an indication of the detected misalignment and a request for a confirmation to implement the requested change;
in response to receiving a response to the alert indicating to implement the requested change, allow implementation of the requested change; and
in response to receiving a response to the alert indicating not to implement the requested change, prevent implementation of the requested change;
wherein the request further comprises a request to amend code of the hosted application to include instructions to call data from a new data source; and
the processor is further configured to:
amend the code of the hosted application to include the instructions to call the data from the new data source;
determine that the new data source is not accessible to the hosted application; and
after determining that the new data source is not accessible to the hosted application, automatically reconfigure the hosted application to allow the hosted application to access the new data source; and
a visualization tool coupled to the data lineage database and a network, the visualization tool configured to:
receive, via the network, a request to provide a visual representation of a portion of one or both of the application data record and the server data record;
generate the requested visual representation; and
provide, via the network, the visual representation for viewing via the administrator device, wherein the visual representation comprises a map illustrating in which hardware components of the server functions of the hosted application or the reconfigured hosted application are implemented.

2. The system of claim 1, wherein the received request for the change comprises a request to change at least one of the configuration of the server, the code of the hosted application, the configuration of the hosted application, a synchronization time of the hosted application, a data monitoring protocol included in the code of the hosted application, a data storage type used by the server, a log configuration of the server, a network configuration of the server.

3. The system of claim 1, wherein:
the received request comprises a request to change code of the hosted application corresponding to changing a data synchronization rate of the hosted application to an updated data synchronization rate, wherein the data synchronization rate is a rate at which data is synchronized between the hosted application and the new data source; and
the processor is further configured to determine if the misalignment detected by:
comparing the updated data synchronization rate to a threshold range of data synchronization values included in the data lineage criteria;
determining, based on the comparison of the updated data synchronization rate to the threshold range of data synchronization values, whether the updated data synchronization rate is within the threshold range of data synchronization values;
in response to determining that the updated data synchronization rate is within the threshold range of data synchronization values, determine that the misalignment is not detected; and
in response to determining that the updated data synchronization rate is not within the threshold range of data synchronization values, determine that the misalignment is detected.

4. The system of claim 1, wherein:
the processor of the knowledge management tool further configured, in response to receiving a response indicating to implement the requested change, to:
provide the requested change to the data lineage database; and
update one or both of the application data record and the server data record to include the requested change.

5. The system of claim 4, the processor further configured to:
receive the updated application data record and the updated server data record; and
adjust the ranges of values for the server configuration data and the application configuration data of the data lineage criteria, based on the received updated application data record and updated server data record.

6. A method comprising:
storing a data lineage database comprising an application data record comprising a record of application configuration data and a server data record comprising a record of server configuration data;
receiving a request to change one or more of a configuration of a server, a code of a hosted application, and a configuration of the hosted application;
determining whether a misalignment is detected associated with the requested change being outside at least one predefined range of values for the server configuration data and the application configuration data of data lineage criteria, the data lineage criteria comprising predefined ranges of values for the server configuration data and the application configuration data;
in response to determining that the misalignment is not detected, allowing the requested change to be implemented in one or both of the server and the hosted application;
in response to determining that the misalignment is detected:
providing an alert to an administrator device, the alert comprising an indication of the detected misalignment and a request for a confirmation to implement the requested change;
in response to receiving a response to the alert indicating to implement the requested change, allow implementation of the requested change; and
in response to receiving a response to the alert indicating not to implement the requested change, prevent implementation of the requested change;
wherein the request further comprises a request to amend code of the hosted application to include instructions to call data from a new data source;
amending the code of the hosted application to include the instructions to call the data from the new data source;
determining that the new data source is not accessible to the hosted application;
after determining that the new data source is not accessible to the hosted application, automatically reconfiguring the hosted application to allow the hosted application to access the new data source;
receiving a request to provide a visual representation of a portion of one or both of the application data record and the server data record;
generating the requested visual representation; and
providing the visual representation for viewing via the administrator device, wherein the visual representation comprises a map illustrating in which hardware components of the server functions of the hosted application or the reconfigured hosted application are implemented.

7. The method of claim 6, wherein the received request for the change comprises a request to change at least one of the configuration of the server, the code of the hosted application, the configuration of the hosted application, a synchronization time of the hosted application, a data monitoring protocol included in the code of the hosted application, a data storage type used by the server, a log configuration of the server, a network configuration of the server.

8. The method of claim 6, wherein:
the received request comprises a request to change code of the hosted application corresponding to changing a data synchronization rate of the hosted application to an updated data synchronization rate, wherein the data synchronization rate is a rate at which data is synchronized between the hosted application and the new data source; and
the method further comprises determining if the misalignment detected by:
comparing the updated data synchronization rate to a threshold range of data synchronization values included in the data lineage criteria;
determining, based on the comparison of the updated data synchronization rate to the threshold range of data synchronization values, whether the updated data synchronization rate is within the threshold range of data synchronization values;
in response to determining that the updated data synchronization rate is within the threshold range of data synchronization values, determine that the misalignment is not detected; and
in response to determining that the updated data synchronization rate is not within the threshold range of data synchronization values, determine that the misalignment is detected.

9. The method of claim 6, further comprising, in response to receiving a response indicating to implement the requested change:
providing the requested change to the data lineage database; and
updating one or both of the application data record and the server data record to include the requested change.

10. The method of claim 9, further comprising:
receiving the updated application data record and the updated server data record; and
adjusting the ranges of values for the server configuration data and the application configuration data of the data lineage criteria, based on the received updated application data record and updated server data record.

11. A device comprising:
a data lineage database comprising an application data record comprising a record of application configuration data and a server data record comprising a record of server configuration data;
a memory configured to store data lineage criteria, the data lineage criteria comprising predefined ranges of values for the server configuration data and the application configuration data; and
a processor coupled to the memory and configured to:
receive a request to change one or more of a configuration of a server, a code of a hosted application, and a configuration of the hosted application;
determine whether a misalignment is detected associated with the requested change being outside at least one of the predefined ranges of values for the server configuration data and the application configuration data of the data lineage criteria;
in response to determining that the misalignment is not detected, allow the requested change to be implemented in one or both of the server and the hosted application;
in response to determining that the misalignment is detected:
provide an alert to an administrator device, the alert comprising an indication of the detected misalignment and a request for a confirmation to implement the requested change;
in response to receiving a response to the alert indicating to implement the requested change, allow implementation of the requested change; and
in response to receiving a response to the alert indicating not to implement the requested change, prevent implementation of the requested change;
wherein the request further comprises a request to amend code of the hosted application to include instructions to call data from a new data source; and
the processor is further configured to:
amend the code of the hosted application to include the instructions to call the data from the new data source;
determine that the new data source is not accessible to the hosted application; and
after determining that the new data source is not accessible to the hosted application, automatically reconfigure the hosted application to allow the hosted application to access the new data source; and a visualization tool coupled to the data lineage database and a network, the visualization tool configured to:

receive, via the network, a request to provide a visual representation of a portion of one or both of the application data record and the server data record;

generate the requested visual representation; and provide, via the network, the visual representation for viewing via the administrator device, wherein the visual representation comprises a map illustrating in which hardware components of the server functions of the hosted application or the reconfigured hosted application are implemented.

12. The device of claim 11, wherein the received request for the change comprises a request to change at least one of the configuration of the server, the code of the hosted application, the configuration of the hosted application, a synchronization time of the hosted application, a data monitoring protocol included in the code of the hosted application, a data storage type used by the server, a log configuration of the server, a network configuration of the server.

13. The device of claim 11, wherein:

the received request comprises a request to change code of the hosted application corresponding to changing a data synchronization rate of the hosted application to an updated data synchronization rate, wherein the data synchronization rate is a rate at which data is synchronized between the hosted application and the new data source; and the processor is further configured to determine if the misalignment detected by:

comparing the updated data synchronization rate to a threshold range of data synchronization values included in the data lineage criteria;

determining, based on the comparison of the updated data synchronization rate to the threshold range of data synchronization values, whether the updated data synchronization rate is within the threshold range of data synchronization values;

in response to determining that the updated data synchronization rate is within the threshold range of data synchronization values, determine that the misalignment is not detected; and in response to determining that the updated data synchronization rate is not within the threshold range of data synchronization values, determine that the misalignment is detected.

14. The device of claim 11, wherein:

the processor of the knowledge management tool further configured, in response to receiving a response indicating to implement the requested change, to:

provide the requested change to the data lineage database; and update one or both of the application data record and the server data record to include the requested change.

15. The device of claim 14, the processor further configured to:

receive the updated application data record and the updated server data record; and adjust the ranges of values for the server configuration data and the application configuration data of the data lineage criteria, based on the received updated application data record and updated server data record.

* * * * *